United States Patent [19]

Benjamin et al.

[11] Patent Number: 4,792,186

[45] Date of Patent: Dec. 20, 1988

[54] VALVE FOR CONTROLLING TWO-WAY FLOW

[75] Inventors: Gary H. Benjamin, Kenton; Harry O. Jones, Findlay, both of Ohio

[73] Assignee: Cooper Tire & Rubber Company, Findlay, Ohio

[21] Appl. No.: 121,829

[22] Filed: Nov. 16, 1987

[51] Int. Cl.⁴ .............................................. A97C 7/42
[52] U.S. Cl. ..................................... 297/284; 137/862
[58] Field of Search ........................ 297/289, DIG. 3; 251/349; 137/862, 867, 870, 883, 614.13, 619.14

[56] References Cited

U.S. PATENT DOCUMENTS

| | | | |
|---|---|---|---|
| 3,091,256 | 5/1963 | Becker | 137/862 X |
| 3,326,601 | 6/1967 | Vanderbilt et al. | 297/284 |
| 3,363,941 | 1/1968 | Wierwille | 297/284 |
| 4,164,962 | 8/1979 | Soderberg | 137/862 |
| 4,491,157 | 1/1985 | Hashimoto | 297/289 X |
| 4,491,364 | 1/1985 | Hattori et al. | 297/284 |
| 4,550,750 | 11/1985 | Korth | 137/867 X |
| 4,552,402 | 11/1985 | Huber et al. | 297/284 |
| 4,655,505 | 4/1987 | Kashiwamura et al. | 297/284 |
| 4,711,269 | 12/1987 | Sule | 137/870 X |

Primary Examiner—Peter A. Aschenbrenner
Attorney, Agent, or Firm—Biebel, French & Nauman

[57] ABSTRACT

A value incorporated into apparatus for controlling rigidity of a vehicle seat includes a housing defining a bore terminating in first and second counterbore ends with a narrowed central portion therebetween. A first port through the housing opens into the central portion, while a second port opens into both counterbore portions at or near the junction with the central portion. A two-piece resilient sealing member is disposed within the bore, and has enlarged first and second ends positioned in sealing contact within the counterbore portions to seal the bore, The sealing member is also normally positioned in sealing contact with the junction areas to seal the central portion from the counterbore portions. The sealing member may be moved longitudinally within the bore to move one of the enlarged portions away from one of the junction areas to open a fluid flow path between the ports. Normally open electrical switches are provided to be actuated upon longitudinal movement of the sealing member.

31 Claims, 3 Drawing Sheets

VALVE FOR CONTROLLING TWO-WAY FLOW

BACKGROUND OF THE INVENTION

The present invention relates generally to valves for controlling the flow of fluid. More particularly, the invention relates to a valve which is capable of directing fluid such as air through a pathway in two alternative directions.

In valves for controlling the flow of a fluidic medium, deformable resilient plugs have been used to effect closure of the fluid passageway through the valve housing. A sealing surface is defined along the passageway within the housing, and the plug closure member is subjected to pressure causing the plug to be deformed into engagement with the sealing portion. Release of the pressure being applied to th plug will permit fluid to flow through the passageway.

Certain models of automobiles include a feature wherein the automobile driver can adjust the rigidity, or conversely, the softness of the driver's seat according to personal preference. The mechanism for such a feature typically includes one or more inflatable bladders located in the lumbar or lower back portion of the seat, with one or more bladders also located in the thigh portion of the seat. Air is selectively directed into or exhausted from either of the bladder sets, whereby the rigidity of the corresponding seat portion is controlled. Such a system is shown generally in U.S. Pat. No. 3,326,601 of Vanderbilt et al.

Valves are required to regulate air flow into and out of the bladders located in the vehicle seat portions. In turn, driver-operable controls are needed to actuate the valves. Also, since air entering the bladders must be pumped or placed under pressure, the controls must be simultaneously capable of actuating an appropriate pumping or compressing mechanism. As with any other automotive device requiring selective control, the controls for adjustment of seat rigidity should be easily operable and located within easy reach of the driver.

What is needed, therefore, is a valve which is particularly adapted for use in conjunction with a seat adjustment mechanism as described above. Such a valve must provide easy and convenient control for the mechanism, and should be useful in both inflating and deflating the bladders incorporated within the device. At the same time, the valve should be reliable and of relatively simple and inexpensive construction.

SUMMARY OF THE INVENTION

In meeting the foregoing needs, the present invention provides a valve for controlling the flow of fluid, specifically adapted for use with a seat adjustment mechanism. The valve includes a housing defining a bore extending therethrough, the bore terminating in first and second counterbore end portions defining a narrowed central portion therebetween, and first and second junction areas connecting the first and second counterbore portions, respectively, with the central portion.

The housing also defines a first port extending through the housing and opening into the central portion of the bore, and a second port extending through the housing and opening into both of the first and second counterbore portions at or near the junction areas. A resilient sealing member, normally formed from two separate pieces positioned in contact with each other, is disposed within the bore. The two-piece member has enlarged first and second ends positioned respectively in sealing contact within the first and second counterbore portions to seal the bore. The sealing member is further normally positioned in sealing contact with the junction areas to seal the central portion from the counterbore portions.

Means for longitudinally moving the sealing member within the bore is provided to move one of the enlarged portions away from one of the junction areas, while deforming an opposite one of the enlarged portions further into sealing contact with a corresponding one of the junction areas. Actuator means connected to the longitudinal moving means enables an operator to cause longitudinal movement of the sealing member, whereby longitudinal movement of the sealing member in either direction opens a fluid flow path from the first to the second port.

The resilient sealing member preferably extends through the central portion of the bore in non-sealing relationship therewith. Each of the junction areas includes a planar surface perpendicular to both a corresponding one of the counterbore portions and the central portion. The enlarged portions of the sealing member each includes a cylindrical end member of a diameter slightly larger than the diameter of the counterbore portion and a frustoconical portion connecting the end member with the portion of the sealing member extending through the central portion of the bore. The frustoconical portion is normally positioned against the connection between the central portion of the bore and the planar surface defining the junction area to form a seal.

The second port may open into each of the counterbore portion through the planar surfaces.

The valve may further include first and second normally-open electrical switches. Means for closing the first switch in response to movement of the longitudinal moving means in a first direction is provided, along with means for closing the second switch in response to movement of the longitudinal moving means in a second, opposite direction.

The longitudinal moving means may include a yoke member including a beam and first and second parallel legs. The beam is positioned parallel to the bore with the first leg disposed against an end surface of the first enlarged portion and the second leg disposed against an end surface of the second enlarged portion. The actuator includes a lever pivotally connected to the beam and to the housing, whereby pivotal movement of the lever in a first direction results in longitudinal movement of the beam in a second, opposite direction.

The first and second normally-open electrical switches may be pressure actuated switches, the first switch being connected to the housing near the first leg near the enlarged portion of the first piece of the sealing member, and the second switch being connected to the housing near the second leg near the enlarged portion of the second piece of the sealing member. Movement of the yoke member in the first direction causes the second leg to contact and close the second switch, and movement of the yoke member in the second direction causes the first leg to contact and close the first switch.

The valve in accordance with the present invention may alternatively include a housing defining a pair of parallel bores extending therethrough, with each of the bores terminating in first and second counterbore end portions defining a narrowed central portion therebetween and first and second junction areas connecting the first and second counterbore portions, respectively, with the central portion. A pair of first ports each extend through the housing, each opening into the central portion of one of the bores.

A resilient two-piece sealing member is disposed within each of the bores, with each member having enlarged first and second ends positioned respectively in sealing contact within the first and second counterbore portions to seal the bore, each sealing member further being normally positioned in sealing contact with the junction areas to seal the central portion from the counterbore portions.

Means is provided for selectively longitudinally moving one of the the sealing members within a corresponding one of the bores to move one of the enlarged portions away from one of the junction areas while deforming an opposite one of the enlarged portions further into sealing contact with a corresponding one of the junction areas.

The housing further defines a single second port extending through the housing and opening into both of the first and second counterbore portions of both of the bores at or near the junction areas.

Actuator means is connected to the longitudinal moving means for enabling an operator to selectively cause longitudinal movement of either of the sealing members, whereby longitudinal movement of the sealing member in either direction opens a fluid flow path from a corresponding one of the first ports to the second port.

The valve may further include first, second, third and fourth normally-open electrical switches. Means is provided for closing the first switch in response to longitudinal movement of one of the sealing members in a first direction, and for closing the second switch in response to movement of the one sealing member in a second, opposite direction. In addition, means is provided for closing the third switch in response to longitudinal movement of the other of the sealing members in a first direction and for closing the fourth switch in response to movement of the other sealing member in a second, opposite direction.

The longitudinal moving means may include a pair of yoke members, with each including a beam and first and second parallel legs. Each beam is positioned parallel to one of the bores with the first leg disposed against an end surface of the first enlarged portion disposed therein and the second leg disposed against an end surface of the second enlarged portion disposed therein.

The first, second, third and fourth switches may be normally open, pressure actuated switches. The first switch is connected to the housing near the first leg of the one yoke member opposite the first enlarged portion, and the second switch is connected to the housing near the second leg of the one yoke portion opposite the second enlarged portion. Thus, movement of the one yoke member in the first direction causes the second leg to contact and close the second switch, and movement of the one yoke member in the second direction causes the first leg to contact and close the first switch. The third switch is connected to the housing near the first leg of the other yoke member opposite the first enlarged portion, while the fourth switch is connected to the housing near the second leg of the other yoke portion opposite the second enlarged portion. Movement of the other yoke member in the first direction causes the second leg to contact and close the fourth switch, and movement of the other yoke member in the second direction causes the first leg to contact and close the third switch.

The present invention further includes apparatus for controlling the rigidity of a seat, including an inflatable bladder located in the seat, an electrically operated reversible air pump, and a valve for controlling the flow of air into and out of the bladder. The valve includes a housing defining a bore terminating in first and second counterbore end portions defining a narrowed central portion therebetween, a first port extending through the housing and opening into the central portion of the bore, and a second port extending through the housing and opening into both of the first and second counterbore portions.

A resilient sealing member disposed within the bore has enlarged first and second ends positioned respectively in sealing contact within the first and second counterbore portions to seal the bore, the sealing member further being normally positioned in sealing contact with the junction between the counterbored portions and the central portion to seal the central portion from the counterbore portions. Means is provided for longitudinally moving the sealing member within the bore to move one of the enlarged portions away from one of the junction areas while deforming an opposite one of the enlarged portions further into sealing contact with a corresponding one of the junction areas. Actuator means connected to the longitudinal moving means enables an operator to cause longitudinal movement of the sealing member, whereby longitudinal movement of the sealing member in either direction opens a fluid flow path from the first to the second port.

The apparatus further includes a first air line connecting the bladder and the first port, and a second air line connecting the air pump and the second port.

The longitudinal moving means may includes a yoke member including a beam and first and second parallel legs, the beam being positioned parallel to the bore with the first leg disposed against an end surface of the first enlarged portion and the second leg disposed against an end surface of the second enlarged portion. The actuator includes a lever pivotally connected to the beam and to the housing, whereby pivotal movement of the lever in a first direction results in longitudinal movement of the beam in a second, opposite direction.

The valve may further include first and second normally-open, pressure actuated electrical switches. The first switch is connected to the housing near the first leg opposite the first enlarged portion, and the second switch is connected to the housing near the second leg opposite the second enlarged portion. Movement of the yoke member in the first direction causes the second leg to contact and close the second switch, while movement of the yoke member in the second direction causes the first leg to contact and close the first switch.

Alternatively, the apparatus may be for controlling the rigidity of a seat having a lumbar support portion and a thigh support portion. The apparatus includes a first inflatable bladder located in the lumbar support portion, a second inflatable bladder located in the thigh support portion, an electrically-operated reversible air pump, and a valve for controlling the flow of air into and out of the first and second bladders.

The valve includes a housing defining a pair of parallel bores extending therethrough, each bore terminating in first and second counterbore end portions defining a narrowed central portion therebetween. The housing further defines a pair of first ports, each opening into the central portion of one of the bores, and a single second port opening into both of the first and second counterbore portions of both of the bores at or near the junction areas with the narrowed central portions. A resilient sealing member is disposed within each of the bores, the member having enlarged first and second ends positioned respectively in sealing contact within the first and second counterbore portions to seal the bore. Means is provided for selectively longitudinally moving one of the the sealing members within a corresponding one of the bores to move one of the enlarged portions away from one of the junction areas while deforming an opposite one of the enlarged portions further into sealing contact with a corresponding one of the junction areas. An actuator means connected to the longitudinal moving means enables an operator to selectively cause longitudinal movement of either of the sealing members, whereby longitudinal movement of the sealing member in either direction opens a fluid flow path from a corresponding one of the first ports to the second port.

The apparatus further includes a first air line connecting the first bladder and one of the first ports, a second air line connecting the second bladder and the other of the first ports, and a third air line connecting the air pump and the second port.

Such an apparatus may further include first, second, third and fourth normally-open, pressure actuated electrical switches. The longitudinal moving means includes a pair of yoke members, each including a beam and first and second parallel legs, each of the beams being positioned parallel to one of the bores with the first leg disposed against an end surface of the first enlarged portion disposed therein and the second leg disposed against an end surface of the second enlarged portion disposed therein.

The first switch is connected to the housing near the first leg of the one yoke member opposite the first enlarged portion. The second switch is connected to the housing near the second leg of the one yoke portion opposite the second enlarged portion. Movement of the one yoke member in the first direction then causes the second leg to contact and close the second switch, and movement of the one yoke member in the second direction causes the first leg to contact and close the first switch. The third switch is connected to the housing near the first leg of the other yoke member opposite the first enlarged portion. The fourth switch is connected to the housing near the second leg of the other yoke portion opposite the second enlarged portion. Movement of the other yoke member in the first direction thus causes the second leg to contact and close the fourth switch, and movement of the other yoke member in the second direction causes the first leg to contact and close the third switch.

Accordingly, it is an object of the present invention to provide an apparatus for controlling the rigidity of an automobile seat in which inflatable bladders are used to provide a means of varying rigidity; to provide such an apparatus which include a valve for controlling the flow of air into and out of the bladders used in such a system; to provide such a valve which controls flow in either direction with a minimum of action on the part of an operator; to provide such a valve which is capable of controlling actuation of an air pump for causing air flow to or from the bladders; and to provide such a valve which is reliable and relatively simple and inexpensive to manufacture.

Other objects and advantages of the invention will be apparent from the following description, the accompanying drawings, and the appended claims.

DETAILED DESCRIPTION OF THE PREFERRED EMBODIMENT

Figure 1:
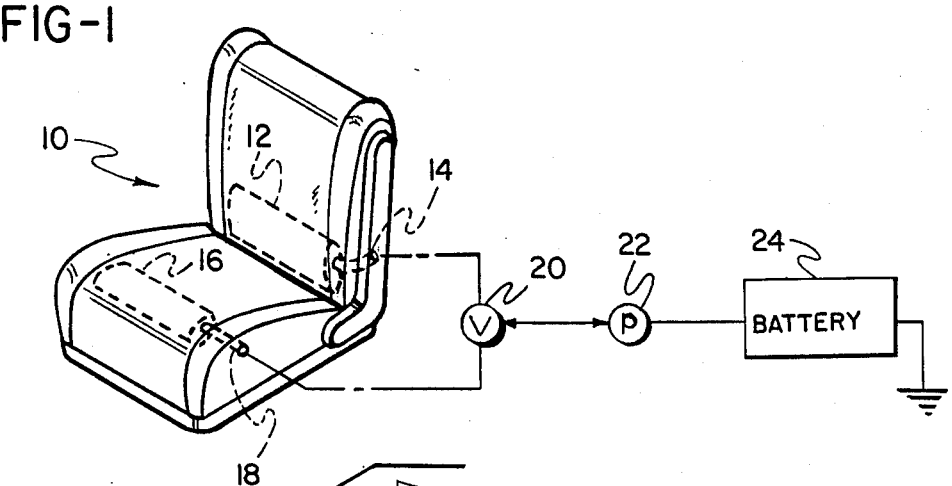
FIG. 1 is a schematic diagram of an apparatus for controlling rigidity of a vehicle seat in which a valve according the present invention may be used.

Referring to FIG. 1, an automobile seat 10 is shown which includes a mechanism for adjusting the rigidity of the seat. An inflatable bladder 12 is located in the lower back or or lumbar portion of the seat, and includes an air inlet line 14 opening into the interior of the bladder 12. A second bladder 16 is positioned within the thigh portion of the seat, and includes a similar inlet 18. Inlets 14 and 18 are connected to a valve 20, which is in accordance with the present invention and will be described in detail below.

Valve 20 includes operator actuator controls (not shown) which are used to energize a reversible air pump 22 connected through electric and air lines to valve 20. Pump 22 is in turn connected to the automobile battery 24. Upon actuation of the appropriate control within valve 20, pump 22 is energized to provide air under pressure to a selected one of bladders 12 or 16. When the control is released, valve 20 closes the appropriate air line, thereby maintaining the bladder at a desired air press are. The controls may be actuated in an opposite manner, thereby powering pump 22 in a reverse direction and opening the air line connecting the selected bladder 12 or 16. This withdraws air from the bladder, quickly reducing the pressure within the bladder. Upon release of the control, the bladder is maintained at the new air pressure.

Figure 2:
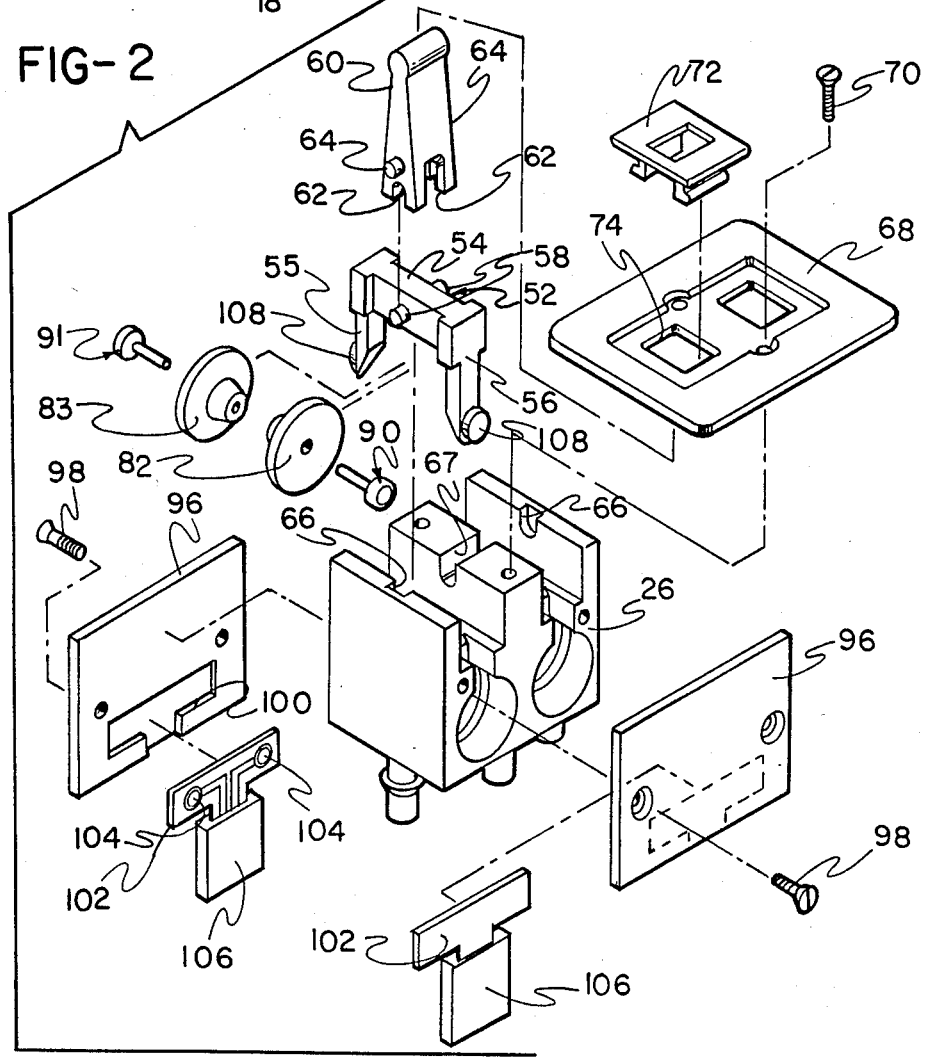
FIG. 2 is an exploded three-quarter view of a valve according to the present invention.

Referring now to FIG. 2, the valve according to the present invention is shown in exploded fashion. A housing 26 is preferably molded from a suitable plastic material. As better seen by reference to FIGS. 4 and 5, housing 26 is provided with a pair of central, cylindrical bores 28, each of which terminates in first and second counterbore end portions 30 and 32, respectively. A partition 34 separates bore 28 from an upper open housing portion 35. Formed into each end of partition 34 is one of a pair of notches 36 and 38, each notch 36 and 38 opening into a respective one of the counterbore portions 30 and 32.

Counterbore portions 30 and 32 form between themselves a narrowed central portion 40 of bore 28. A port 42 opens into central portion 40, and extends through the housing, terminating on the housing exterior at a nipple 44.

A central port 46 is formed through housing 26, terminating in a nipple 47, and opens into each central bore 28. Port 46 opens through a semi-circular recess 48 defined in the junction face between narrowed central portion 40 and counterbore 32 of bore 28. Port 46 also opens through a semi-circular recess 49 (see FIG. 5) defined in the junction face between narrowed central portion 40 and counterbore 30 of bore 28. A plurality of openings 50 connect the back-to-back semi-circular recesses 48 and 49.

Figure 3:
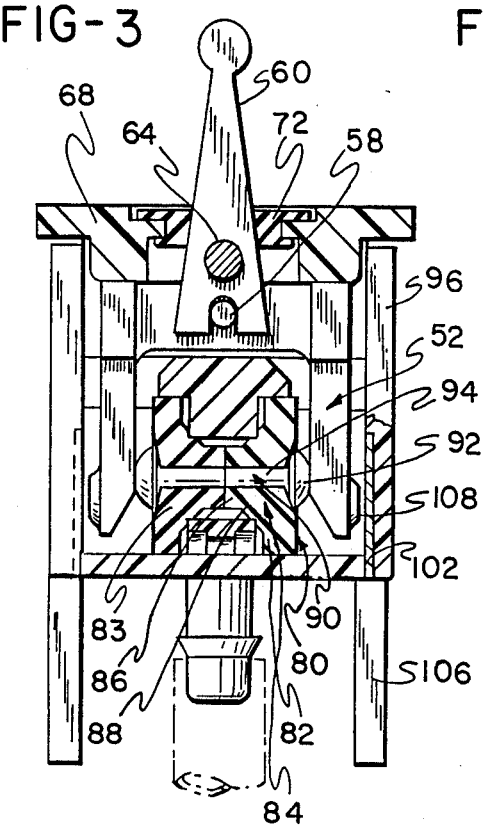
FIG. 3 is a side sectional view of the valve, taken generally along line 3—3 of FIG. 4.
Figure 4:
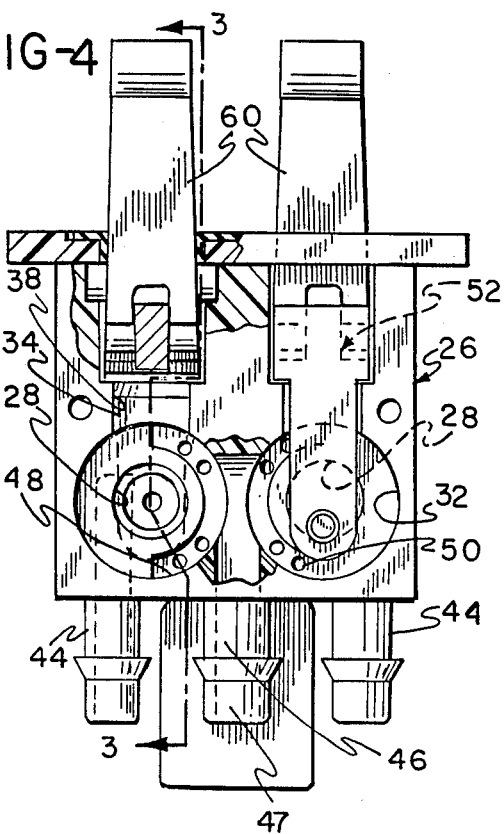
FIG. 4 is an end view of the valve, showing a portion of the and one beam member broken away.
Figure 5:
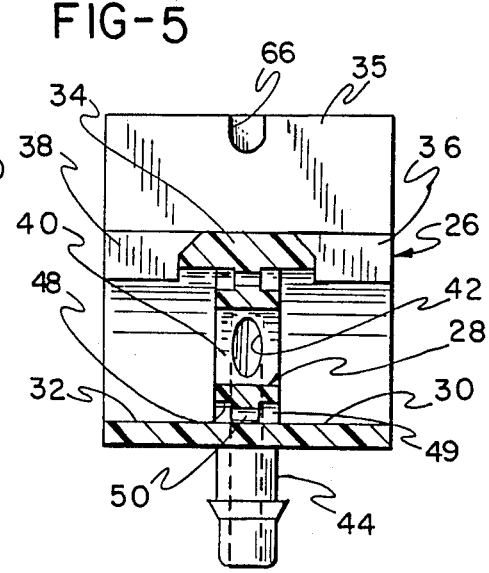
FIG. 5 is a view similar to FIG. 3, but with all portions other the housing removed.

Referring again to FIG. 2, a yoke member 52 includes an enlongated beam portion 54 and a pair of legs 55 and 56 which depend downwardly from each end of beam 54. As shown in FIGS. 3 and 4, a pair of the yoke members 52 are positioned within housing 26 such that the beam 54 of each yoke member is disposed on one partition 34 within upper housing portion 35. Legs 55 and 56 extend downwardly through notches 36 and 38, respectively, with the lower ends of legs 55 and 56 being located within counterbore portions 30 and 32.

As seen in FIG. 2, beam 54 of yoke 52 includes a pair of outwardly extending pins 58, one pin being located on each side of beam 54. An actuating lever 60 is provided with a pair of notches 62 at its lower end, each notch being sized to fit over one pin 58. A pair of pins 64 are formed on lever 60, with each of pins 64 being fittable within a notch 66 or 67 formed into the upper surface of each side wall of housing 26.

A cover plate 68 is positioned on the top of housing 26, and may be secured into place with screws 70. Cover plate 68, when positioned on housing 26, secures pins 64 into place within notches 66 and 67. Thus, movement of lever 60 in either direction causes the lever to rotate about pins 64. At the same time, the engagement of notches 62 with pins 58 causes longitudinal sliding movement of beam 52 along the upper portion 35 of housing 26.

Figure 6:
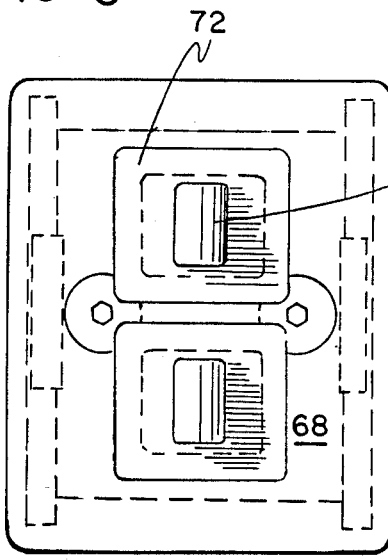
FIG. 6 is a top plan view of the valve.

A sealing member 72 is fittable within each opening 74 defined in cover plate 68 through which lever 60 passes. Sealing member 72 is formed from a resilient material, and as shown in FIGS. 3 and 6, fits closely around lever 60 to prevent dirt, spilled liquids and the like from entering the interior of the valve.

Positioned within each bore 28 of housing 26 is a resilient and deformable two-part rubber sealing member 80. Member 80 is comprised of two identical portions 82 and 83, each portion including a flange 84, a relatively narrow central segment and a frustoconical segment 88 connecting flange 84 and segment 86. As can best be seen in FIG. 3, each portion 82 and 83 is positioned within bore 28 with the central segments 86 extending into central portion 40 of bore 28, and with each flange 84 located in counterbore portion 30 or 32. When in a normal position, each frustoconical segment 88 is positioned in sealing contact with an outer edge of central portion 40 of bore 28, at the junction between the central portion and one of the counterbore portions 30 or 32. The innermost surfaces of the central segments 86 of each portion 82 and 83 are located in mutual contact, so as to define the two-piece sealing member 80.

A rigid pin 90 and 91 is disposed centrally within each sealing portion 82 and 83, respectively. Each pin 90 and 91 includes a head 92 and a shaft 94 extending completely through sealing member portion 82 or 83.

Head 92 of each pin 90 and 91 is located against the inward side of the lower end of each leg 55 and 56, respectively. As a result, sealing member portions 82 and 83 are held in firm engagement with the junctions between narrow central bore portion 40 and counterbore portions 30 and 32. Thus, port 42 is effectively sealed from either end of bore 28. Any fluid entering central bore portion 40 from port 42 will be held within central portion 40.

Also, each flange 84 of sealing member portion 82 and 83 is provided with a diameter slightly larger than the inner diameter of the respective counterbore portion 30 and 32. Thus, flanges 84 form a tight fit and seal the interior portion of bore 28. Any fluid entering counterbore portions 30 and 32 through port 46 and recesses 48 will be held within the innermost regions of counterbore portions 30 and 32.

In one environment, the valve of the present invention may be used in the selective directing of air into or out of inflatable bladders. Such a system may be used in an automobile seat rigidity adjust mechanism, such as that previously described in connection with FIG. 1. However, the invention is not limited to use in such an environment.

The valve described as the preferred embodiment herein can control air flow into and out of two independent bladders or two independent groups of bladders, with each bore 28 and portions associated therewith constituting an independent valve. An inflatable bladder is connected by an appropriate hose or tube to one of two nipples 44 for communication with port 42 located in central portion 40 of the corresponding bore 28 (see FIG. 4). A reversible air pump is connected by a tube or hose to nipple 47. Such an environment will be referred to in describing the operation of the valve of the present invention. Of course, it will be understood that the valve of the present invention may be used in other environments where bi-directional control of fluid flow is desired, and it will be readily apparent how appropriate connection of the valve may be made.

To provide electrical control for the air pump, a side cover plate 96 is secured by screws 98 to each side of housing 26, as best seen in FIG. 2. Along the lower inner portion of each cover plate 96 is defined a recess 100 into which is placed a membrane switch assembly 102. Assembly 102 includes a pair of contact areas 104, each of which defines a single pole, normally open switch. An appropriate connector 106 is attached to assembly 102, and is provided with means for joining four leads (not shown) to the switch assembly 102, two leads being supplied for each switch comprising the assembly. Once assembly 102 is located within recess 100, and cover plate 96 is secured to housing 26, assembly 102 is secured in position as can be seen in FIG. 3.

A raised portion 108 is formed on the lower outer surface of each leg 55 and 56 of yoke member 52. When yoke member 52 is properly positioned within housing 26 and cover plate 96 is attached to the housing, each raised portion 108 will be aligned with a contact portion 104 located on one switch assembly 102. Longitudinal movement of yoke member 52 causes raised portion 108 to press against contact portion 104, thereby establishing electrical contact through the corresponding switch portion of switch assembly 102. Since a switch assembly 102 is located on each side of housing 26, longitudinal movement of yoke portion 52 in either direction actuates one switch assembly 102.

Figure 7:
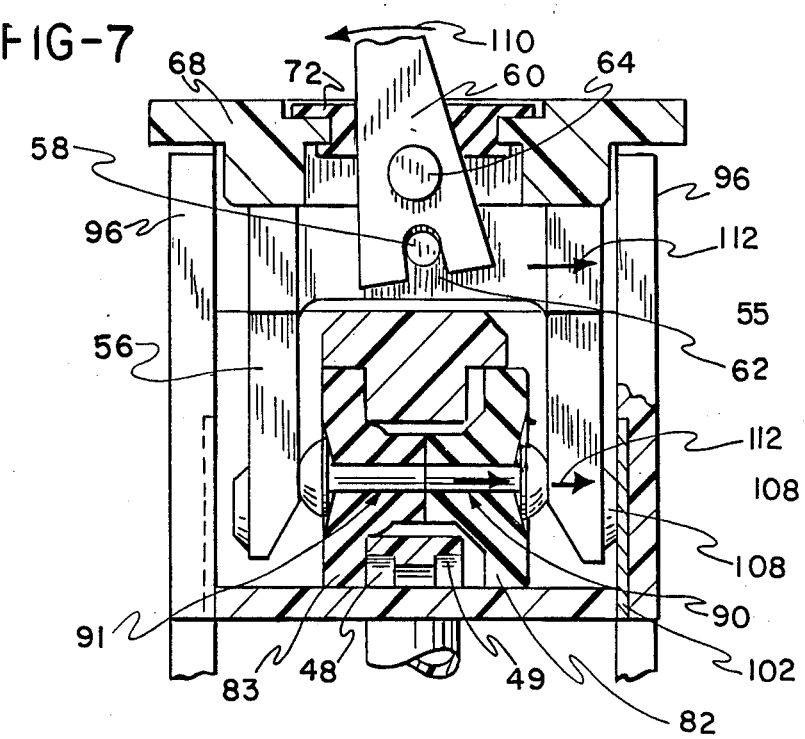
FIG. 7 is a similar to FIG. 3, showing the valve actuated in a first direction.

In its normal position, the valve is as shown in FIG. 3. To cause inflation of one of the bladders located within the vehicle seat, the appropriate actuating lever is pivotally moved as shown in FIG. 7, in the direction indicated by arrow 110. Actuator 60 pivots about pins 64, causing slots 62 to exert a longitudinal force on pins 58. This in turn moves yoke member 52, including legs 55 and 56, in a direction opposite to the movement of actuator lever 60, shown by arrows 112. Such movement also longitudinally moves pins 90. As a result, sealing member portion 83 is forced further against the junction between counterbore portion 32 and central portion 40 of bore 28, slightly deforming sealing member portion 83 such that its corresponding central segment 86 is moved further into the central portion 40. Member portion 83 remains in sealing contact with the junction area at its end of narrowed central portion 40.

At the same time, sealing member portion 82 is forced outwardly. This pushes the entire portion 82 away from sealing engagement. However, flange 84 of sealing member portion 82 remains in sealing contact with the interior of counterbore portion 30 so that a sealed fluid path is completed between central portion 40 and one recess 48. Referring back to FIGS. 3 and 4, it will be recalled that recess 49 is connected to port 46 and central portion 40 is connected to port 42. Thus, a complete fluid path extends between ports 42 and 46.

At the same time, raised portion 108 on leg 55 will be longitudinally moved into contact with switch assembly 102. Such contact will cause the corresponding switch within assembly 102 to be closed, thereby establishing an electrical control circuit through switch assembly 102.

Completion of the control circuit is used to energize a reversible air pump in a forward direction to force air under pressure through common port 46 and into recesses 48 and 49. Such air will then pass by sealing member 82 and into the central portion 40 of bore 28. The air will then enter port 42 and be directed to inflate the bladder. It will be noted from FIGS. 3 and 4 that, at the same time, the pressurized air will enter into recesses 48 and 49 in the adjacent and unactuated valve assembly. However, due to the positioning of sealing member portions 82 and 83, the air in such valve will not be able to pass into central portion 40 of bore 28.

Upon release of actuating lever 60, sealing member portions 82 and 83 will return to their initial positions as shown in FIG. 3. Electrical contact in switch assembly 102 will be discontinued, and the air pump will be deactuated. While air from the bladder can then pass back through port 42 into central portion 40 of bore 28, it will be prevented by the frustoconical segments of sealing member portions 82 and 83 from passing out of the central portion.

Figure 8:
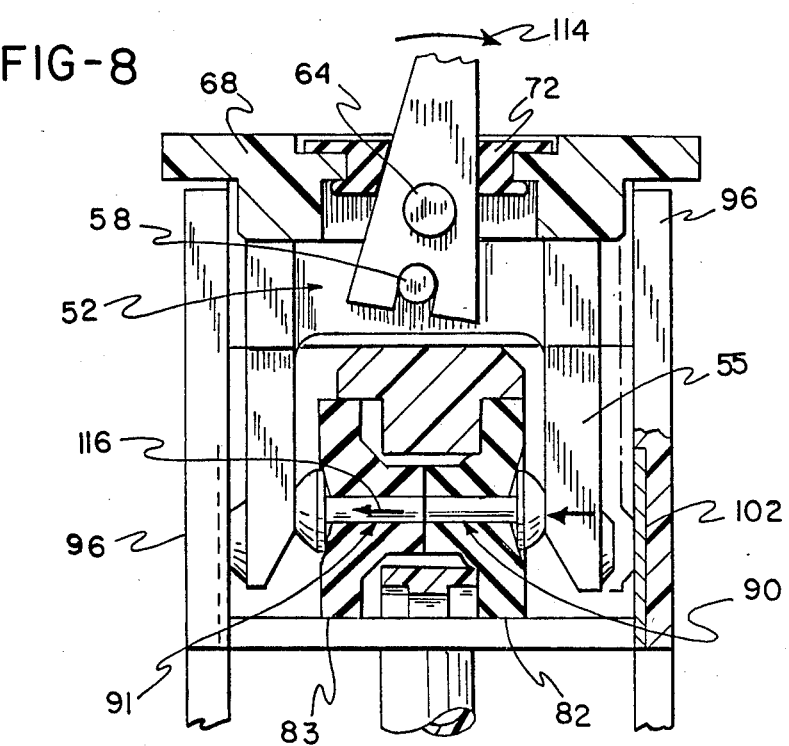
FIG. 8 a view similar to FIG. 3, showing the valve actuated in a second, opposite direction.

To deflate the bladder, actuator lever 60 is moved in the opposite direction as indicated in FIG. 8 by arrow 114. Yoke member 52 is longitudinally moved in an opposite direction, as shown by arrows 116. This in turn moves sealing member portions 82 and 83 such that portion 82 is forced further into contact with the junction between counterbore portion 30 and central portion 40 of bore 28. At the same time, sealing member portion 83 is moved away from the junction area between counterbore portion 32 and central portion 40. Thus, an air flow path is again created between ports 42 and 46.

At the same time, raised portion 108 on leg 56 contacts the opposite switch assembly 102, thereby connecting a control circuit which is used to power the air pump in the reverse direction. This will draw air from the bladder through ports 42 and 46 to deflate the bladder. Upon release of lever 60, the lever returns to its normal position, again sealing the valve from air flow between ports 42 and 46, thereby maintaining the new, lower pressure with the bladder.

It will be recognized that while a pair of identical valving members are shown contained within housing 26, any number of valve units which may be incorporated into a single housing 26 can be used. However, in such case it may be necessary to provide a plurality of common ports analogous to port 46 of the preferred embodiment, each of which ports is connected to the air pump. Each valve mechanism, of course, may then be operated independently in the manner which has already been described.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A valve for controlling the flow of fluid, comprising:
    a housing defining a bore extending therethrough, said bore terminating in first and second counterbore end portions defining a narrowed central portion therebetween and first and second junction areas connecting said first and second counterbore portions, respectively, with said central portion;
    said housing further defining a first port extending through said housing and opening into said central portion of said bore;
    a resilient sealing member disposed within said bore, said member having enlarged first and second ends positioned respectively in sealing contact within said first and second counterbore portions to seal said bore, said sealing member further being normally positioned in sealing contact with said junction areas to seal said central portion from said counterbore portions;
    means for longitudinally moving said sealing member within said bore to move one of said enlarged portions away from one of said junction areas while deforming an opposite one of said enlarged portions further into sealing contact with a corresponding one of said junction areas;
    said housing further defining a second port extending through said housing and opening into both of said first and second counterbore portions at or near said junction areas; and
    actuator means connected to said longitudinal moving means for enabling an operator to cause longitudinal movement of said sealing member, whereby longitudinal movement of said sealing member in either direction opens a fluid flow path from said first to said second port.

2. A valve as defined in claim 1, wherein said resilient sealing member extends through said central portion of said bore in non-sealing relationship therewith.

3. A valve as defined in claim 2, wherein said resilient sealing member is formed from two identical portions disposed in contact with each other.

4. A valve as defined in claim 2, wherein each of said junction areas includes a planar surface perpendicular to both a corresponding one of said counterbore portions and said central portion.

5. A valve as defined in claim 4, wherein said enlarged portions of said sealing member each includes a cylindrical end member of a diameter equal to the diameter of said counterbore portion and a frustoconical portion connecting said end member with a portion of said sealing member extending through said central portion of said bore.

6. A valve as defined in claim 5, wherein said frustoconical portion is normally positioned against the connection between said central portion of said bore and said planar surface defining said junction area to form a seal.

7. A valve as defined in claim 4, wherein said second port opens into each of said counterbore portion through said planar surfaces.

8. A valve as defined in claim 1, further comprising first and second normally-open electrical switches, and means for closing said first switch in response to movement of said longitudinal moving means in a first direction and for closing said second switch in response to movement of said longitudinal moving means in a second, opposite direction.

9. A valve as defined in claim 1, wherein said longitudinal moving means includes a yoke member including a beam and first and second parallel legs, said beam being positioned parallel to said bore with said first leg disposed against an end surface of said first enlarged portion and said second leg disposed against an end surface of said second enlarged portion.

10. A valve as defined in claim 9, wherein said actuator includes a lever pivotally connected to said beam and to said housing, whereby pivotal movement of said lever in a first direction results in longitudinal movement of said beam in a second, opposite direction.

11. A valve as defined in claim 9, further comprising first and second normally-open electrical switches, and means for closing said first switch in response to movement of said yoke member in a first direction and for closing said second switch in response to movement of said yoke member in a second, opposite direction.

12. A valve as defined in claim 11, wherein said first and second switches are pressure actuated switches, said first switch being connected to said housing near said first leg opposite said first enlarged portion, said second switch being connected to said housing near said second leg opposite said second enlarged portion, whereby movement of said yoke member in said first direction causes said second leg to contact and close said second switch, and whereby movement of said yoke member in said second direction causes said first leg to contact and close said first switch.

13. A valve for controlling the flow of fluid, comprising:
a housing defining a pair of parallel bores extending therethrough, each of said bores terminating in first and second counterbore end portions defining a narrowed central portion therebetween and first and second junction areas connecting said first and second counterbore portions, respectively, with said central portion;
said housing further defining a pair of first ports, each extending through said housing and opening into said central portion of one of said bores;
a resilient sealing member disposed within each of said bores, said member having enlarged first and second ends positioned respectively in sealing contact within said first and second counterbore portions to seal said bore, said sealing member further being normally positioned in sealing contact with said junction areas to seal said central portion from said counterbore portions;
means for selectively longitudinally moving one of said sealing members within a corresponding one of said bores to move one of said enlarged portions away from one of said junction areas while deforming an opposite one of said enlarged portions further into sealing contact with a corresponding one of said junction areas;
said housing further defining a second port extending through said housing and opening into both of said first and second counterbore portions of both of said bores at or near said junction areas; and
actuator means connected to said longitudinal moving means for enabling an operator to selectively cause lateral movement of either of said sealing members, whereby longitudinal movement of said sealing member in either direction opens a fluid flow path from a corresponding one of said first ports to said second port.

14. A valve as defined in claim 13, wherein said resilient sealing member is formed from two identical portions disposed in contact with each other.

15. A valve as defined in claim 13, wherein each of said junction areas includes a planar surface perpendicular to both a corresponding one of said counterbore portions and said central portion.

16. A valve as defined in claim 15, wherein said second port extends through said housing between said bores and opens into each of said counterbore portion through said planar surfaces.

17. A valve as defined in claim 13, further comprising first, second, third and fourth normally-open electrical switches, means for closing said first switch in response to longitudinal movement of one of said sealing members in a first direction and for closing said second switch in response to movement of said one sealing member in a second, opposite direction, and means for closing said third switch in response to longitudinal movement of the other of said sealing members in a first direction and for closing said fourth switch in response to movement of said other sealing member in a second, opposite direction.

18. A valve as defined in claim 13, wherein said longitudinal moving means includes a pair of yoke members, each including a beam and first and second parallel legs, each of said beams being positioned parallel to one of said bores with said first leg disposed against an end surface of said first enlarged portion disposed therein and said second leg disposed against an end surface of said second enlarged portion disposed therein.

19. A valve as defined in claim 18, further comprising first, second third and fourth normally-open electrical switches, means for closing said first switch in response to longitudinal movement of one of said yoke members in a first direction and for closing said second switch in response to movement of said one yoke member in a second, opposite direction, and means for closing said third switch in response to longitudinal movement of the other of said yoke members in a first direction and for closing said fourth switch in response to movement of said other yoke member in a second, opposite direction.

20. A valve as defined in claim 19, wherein:
said first, second, third and fourth switches are pressure actuated switches;
said first switch being connected to said housing near said first leg of said one yoke member opposite said first enlarged portion;

said second switch being connected to said housing near said second leg of said one yoke portion opposite said second enlarged portion;

whereby movement of said one yoke member in said first direction causes said second leg to contact and close said second switch, and whereby movement of said one yoke member in said second direction causes said first leg to contact and close said first switch;

said third switch being connected to said housing near said first leg of said other yoke member opposite said first enlarged portion;

said fourth switch being connected to said housing near said second leg of said other yoke portion opposite said second enlarged portion;

whereby movement of said other yoke member in said first direction causes said second leg to contact and close said fourth switch, and whereby movement of said other yoke member in said second direction causes said first leg to contact and close said third switch.

21. Apparatus for controlling the rigidity of a seat, comprising an inflatable bladder located in said seat, an electrically-operated reversible air pump, and a valve for controlling the flow of air into and out of said bladder, said valve including:
  a housing defining a bore extending therethrough, said bore terminating in first and second counterbore end portions defining a narrowed central portion therebetween and first and second junction areas connecting said first and second counterbore portions, respectively, with said central portion;
  said housing further defining a first port extending through said housing and opening into said central portion of said bore;
  a resilient sealing member disposed within said bore, said member having enlarged first and second ends positioned respectively in sealing contact within said first and second counterbore portions to seal said bore, said sealing member further being normally positioned in sealing contact with said junction areas to seal said central portion from said counterbore portions;
  means for longitudinally moving said sealing member within said bore to move one of said enlarged portions away from one of said junction areas while deforming an opposite one of said enlarged portions further into sealing contact with a corresponding one of said junction areas;
  said housing further defining a second port extending through said housing and opening into both of said first and second counterbore portions at or near said junction areas; and
  actuator means connected to said longitudinal moving means for enabling an operator to cause longitudinal movement of said sealing member, whereby longitudinal movement of said sealing member in either direction opens a fluid flow path from said first to said second port;
  said apparatus further comprising a first air line connecting said bladder and said first port, and a second air line connecting said air pump and said second port.

22. A valve as defined in claim 21, further comprising first and second normally-open electrical switches, and means for closing said first switch in response to movement of said longitudinal moving means in a first direction and for closing said second switch in response to movement of said longitudinal moving means in a second, opposite direction, said first switch being connected to said pump for controlling energization of said pump in a forward direction, said second switch being connected to said pump for controlling energization of said pump in a reverse direction.

23. A valve as defined in claim 21, wherein said longitudinal moving means includes a yoke member including a beam and first and second parallel legs, said beam being positioned parallel to said bore with said first leg disposed against an end surface of said first enlarged portion and said second leg disposed against an end surface of said second enlarged portion.

24. A valve as defined in claim 23, wherein said actuator includes a lever pivotally connected to said beam and to said housing, whereby pivotal movement of said lever in a first direction results in longitudinal movement of said beam in a second, opposite direction.

25. A valve as defined in claim 24, further comprising first and second normally-open electrical switches, and means for closing said first switch in response to movement of said yoke member in a first direction and for closing said second switch in response to movement of said yoke member in a second, opposite direction, said first switch being connected to said pump for controlling energization of said pump in a forward direction, said second switch being connected to said pump for controlling energization of said pump in a reverse direction.

26. A valve as defined in claim 25, wherein said first and second switches are pressure actuated switches, said first switch being connected to said housing near said first leg opposite said first enlarged portion, said second switch being connected to said housing near said second leg opposite said second enlarged portion, whereby movement of said yoke member in said first direction causes said second leg to contact and close said second switch, and whereby movement of said yoke member in said second direction causes said first leg to contact and close said first switch.

27. Apparatus for controlling the rigidity of a seat having a lumbar support portion and a thigh support portion, comprising a first inflatable bladder located in said lumbar support portion, a second inflatable bladder located in said thigh support portion, an electrically operated reversible air pump, and a valve for controlling the flow of air into and out of said first and second bladders, said valve including:
  a housing defining a pair of parallel bores extending therethrough, each of said bores terminating in first and second counterbore end portions defining a narrowed central portion therebetween and first and second junction areas connecting said first and second counterbore portions, respectively, with said central portion;
  said housing further defining a pair of first ports, each extending through said housing and opening into said central portion of one of said bores;
  a resilient sealing member disposed within each of said bores, said member having enlarged first and second ends positioned respectively in sealing contact within said first and second counterbore portions to seal said bore, said sealing member further being normally positioned in sealing contact with said junction areas to seal said central portion from said counterbore portions;
  means for selectively longitudinally moving one of said sealing members within a corresponding one of said bores to move one of said enlarged portions away from one of said junction areas while deforming an opposite one of said enlarged portions further into contact with a corresponding one of said junction areas;

said housing further defining a second port extending through said housing and opening into both of said first and second counterbore portions of both of said bores at or near said junction areas; and actuator means connected to said longitudinal moving means for enabling an operator to selectively cause longitudinal movement of either of said sealing members, whereby longitudinal movement of said sealing member in either direction opens a fluid flow path from a corresponding one of said first ports to said second port;

said apparatus further comprising a first air line connecting said first bladder and one of said first ports, a second air line connecting said second bladder and the other of said first ports, and a third air line connecting said air pump and said second port.

28. Apparatus as defined in claim 27, further comprising:

first, second third and fourth normally-open electrical switches;

means for closing said first switch in response to longitudinal movement of one of said sealing members in a first direction and for closing said second switch in response to movement of said one sealing member in a second, opposite direction; and means for closing said third switch in response to longitudinal movement of the other of said sealing members in a first direction and for closing said fourth switch in response to movement of said other sealing member in a second, opposite direction;

said first and third switches being connected to said pump for controlling energization of said pump in a forward direction, and said second and fourth switches being connected to said pump for controlling energization of said pump in a reverse direction.

29. Apparatus as defined in claim 27, wherein said longitudinal moving means includes a pair of yoke members, each including a beam and first and second parallel legs, each of said beams being positioned parallel to one of said bores with said first leg disposed against an end surface of said first enlarged portion disposed therein and said second leg disposed against an end surface of said second enlarged portion disposed therein.

30. Apparatus as defined in claim 29, further comprising:

first, second third and fourth normally-open electrical switches;

means for closing said first switch in response to longitudinal movement of one of said yoke members in a first direction and for closing said second switch in response to movement of said one yoke member in a second, opposite direction; and means for closing said third switch in response to longitudinal movement of the other of said yoke members in a first direction and for closing said fourth switch in response to movement of said other yoke member in a second, opposite direction;

said first and third switches being connected to said pump for controlling energization of said pump in a forward direction, and said second and fourth switches being connected to said pump for controlling energization of said pump in a reverse direction.

31. Apparatus as defined in claim 30, wherein:

said first, second, third and fourth switches are pressure actuated switches;

said first switch being connected to said housing near said first leg of said one yoke member opposite said first enlarged portion;

said second switch being connected to said housing near said second leg of said one yoke portion opposite said second enlarged portion;

whereby movement of said one yoke member in said first direction causes said second leg to contact and close said second switch, and whereby movement of said one yoke member in said second direction causes said first leg to contact and close said first switch;

said third switch being connected to said housing near said first leg of said other yoke member opposite said first enlarged portion;

said fourth switch being connected to said housing near said second leg of said other yoke portion opposite said second enlarged portion;

whereby movement of said other yoke member in said first direction causes said second leg to contact and close said fourth switch, and whereby movement of said other yoke member in said second direction causes said first leg to contact and close said third switch.

* * * * *

UNITED STATES PATENT AND TRADEMARK OFFICE
CERTIFICATE OF CORRECTION

PATENT NO. : 4,792,186
DATED : December 20, 1988
INVENTOR(S) : Gary H. Benjamin, Harry O. Jones It is certified that error appears in the above-identified patent and that said Letters Patent is hereby corrected as shown below:

In the Abstract

Line 1, "value" should be --valve--.

Line 11, "bore," should be --bore.--

Column 15, claim 27, line 4, after "into" insert -- sealing --.

Signed and Sealed this

Twenty-sixth Day of September, 1989

Attest:

DONALD J. QUIGG

Attesting Officer

Commissioner of Patents and Trademarks